United States Patent [19]

Peterson et al.

[11] Patent Number: 5,085,412
[45] Date of Patent: Feb. 4, 1992

[54] SHOCK STRUT

[75] Inventors: Leslie D. Peterson, Tempe; Bruce A. Friedrich, Phoenix, both of Ariz.

[73] Assignee: Simula, Inc., Phoenix, Ariz.

[21] Appl. No.: 523,325

[22] Filed: May 14, 1990

[51] Int. Cl.$^5$ .............................................. B60G 19/04
[52] U.S. Cl. .............................. 267/64.26; 267/64.13; 188/269
[58] Field of Search ..................... 188/269; 267/64.13, 267/64.15, 64.26, 64.11, 64.28, 64.16; 280/708; 244/104 R, 104 FP

[56] References Cited

U.S. PATENT DOCUMENTS

| | | | |
|---|---|---|---|
| 1,179,253 | 4/1916 | Westinghouse | 267/64.11 |
| 1,596,444 | 8/1926 | Morinelli | 267/64.28 |
| 1,718,700 | 6/1929 | Luoma | 267/64.11 |
| 3,056,598 | 10/1962 | Conway et al. | 267/64.26 |
| 3,083,000 | 3/1963 | Perdue | 267/64.26 |
| 3,888,436 | 6/1975 | Sealey | 244/104 FP |
| 4,054,311 | 10/1977 | Gute | 267/64.26 X |

OTHER PUBLICATIONS

"Final Report Active Control Landing Gear—Landing Gear Shock Strut Pressure Management Valve", James C. Warrick, U.S. Army Aviation Research and Technology Activity (AVSCOM), TR-86402, pp. 1-47.
"Military Standard Light Fixed and Rotary-Wing Aircraft Crash Resistance" Department of Defense, MIL-STD-1290A(AV), 26 Sep. 1974, pp. 1-39.
"Military Specification Tests, Impact, Shock Absorber Landing Gear, Aircraft", U.S. Air Force, MIL-T-6053C(USAF), 1 Mar. 1984, pp. 1-15.
"FIG. 1. UH-60A Main Landing Gear", United Technologies, Sikorsky Aircraft 28 Nov. 1978, Document No. SER 70174, pp. II-6.

Primary Examiner—Matthew C. Graham
Assistant Examiner—Peter M. Poon
Attorney, Agent, or Firm—Cahill, Sutton & Thomas

[57] ABSTRACT

A cylinder housing an oil chamber and a piston housing a pair of concentric gas chambers define a telescopingly compressible shock strut. Upon compression of the shock strut, oil under pressure flows from the oil chamber into a compartment defined in part by a floating piston of one of the gas chambers to urge translation of the floating piston if the pressure exerted is above a first threshold and to compress the gas within the chamber. When the oil under pressure exceeds a second threshold, a floating piston of the other of the gas chambers and forming a part of the compartment is urged to translate and to compress the gas in the other gas chamber. A relief valve associated with each gas chamber relieves pressure therein above a further threshold.

7 Claims, 3 Drawing Sheets

SHOCK STRUT

This invention was made under contract DAAJ02-87-C-0012 awarded by the Department of the Army and granting certain rights in this invention to the United States Government.

BACKGROUND OF THE INVENTION

1. Field of the Invention

The present invention relates to shock absorbers and, more particularly, to shock struts for use with aircraft landing gear having a hydraulic chamber combined with a pair of gas chambers operating in series during a first range of energy absorbtion and connected in parallel during a second range of energy absorbtion loads.

2. Description of the Prior Art

The primary purpose of landing gear on an aircraft is to support the aircraft on the ground during normal operations of taxiing, takeoffs and landings. A secondary purpose of such landing gear is to absorb energy in the event of a hard landing and to enhance survival of the occupants of the aircraft in the event of a very hard landing, all without affecting the energy absorbtion capability during normal aircraft operations. Conventional shock absorbing struts, which are part of the landing gear of aircraft limit the loads transferred to the aircraft by absorbing energy through forcing oil flow from an oil chamber to compress a gas chamber as a function of the extent of stroking of the strut. As the strut strokes, the gas chamber telescopes into the oil chamber to force oil through an orifice into the gas chamber resulting in compression of the gas. Usually, a floating piston maintains segregation between the oil and the gas. Control of the oil flow and the gas pressure is vital to the performance of the shock strut.

During normal operations of an aircraft, such as taxiing, a shock strut should provide a force that supports the aircraft and that acts as a spring to soften bumps due to ground surface variations. A resistance to dampen rebound or bouncing of the aircraft should be incorporated. For normal landings, which may be defined as low landing sink rates in the range of 0 to 15 feet per second after the tires have come into contact with the ground, the landing gear should minimize fatigue loading to the fuselage. For moderately hard landings defined as medium sink rates, the landing gear should absorb energy to fully decelerate the fuselage to preclude ground contact by the fuselage. Moreover, the landing gear should prevent expensive fuselage repair by limiting the applied loads to less than the yield strength of the fuselage components. For crash conditions defined as high sink rates up to 42 feet per second, the primary purpose of landing is to protect the occupants of the aircraft by absorbing as much energy as possible to limit the loads imposed to survivable levels.

One known shock strut for absorbing energy imposed in a high sink rate environment incorporates two stages. The first stage includes an a hydraulic chamber interconnected with a gas chamber under pressure through an orifice and poppet valve. A serially attached second stage includes a similar gas chamber at a substantially higher initial pressure. The purpose of this configuration is to permit the lower pressure gas chamber to absorb a range of energy expected from sink rates experienced during normal landings. The second high pressure gas chamber is intended to absorb energy during hard landings resulting from a much higher range of sink rates. In theory, such an arrangement would seem to be idyllic in absorbing energy and limiting the loads imposed. However, because of the exponential pressure increase within the gas chambers, gas pressure produced loads will often exceed the design limit and result in catastrophic failure of the shock strut.

SUMMARY OF THE INVENTION

A shock absorbing strut for aircraft landing gear includes two concentric gas chambers in fluid communication with a hydraulic fluid chamber through a valve/orifice assembly. Upon compression of the strut, hydraulic fluid is forced through the valve/orifice assembly to exert a pressure upon free floating pistons associated with each gas chamber. The two gas chambers are preloaded to different pressures whereby only the free floating piston of the lower pressure chamber will translate until the pressure therein is equivalent to the pressure of the high pressure chamber. A further pressure rise will result in actuation of the free floating piston in the high pressure chamber with both pistons and associated gas chambers operating in parallel instead of the initial series operation. Pressure relief means are provided for each gas chamber to maintain a constant high force and achieve a high efficiency.

It is, therefore, a primary object of the present invention to provide a shock absorber having a hydraulic fluid chamber in combination with a pair of gas chambers operating in series in a first range of pressure and in parallel in a second higher range of pressure.

Another object of the present invention is to provide a nearly total constant pressure within a shock absorbing strut during stroking of the strut.

Still another object of the present invention is to provide a highly dependable high flow capacity valve for a valve/orifice assembly of a shock absorbing strut.

Yet another object of the present invention is to provide a shock absorbing strut having a pair of concentric gas chambers in fluid communication with a hydraulic chamber.

A further object of the present invention is to provide a shock absorbing strut having a pair of concentric gas chambers at different pressure levels to operate serially in combination with a hydraulic chamber until a second pressure level is reached whereupon the gas chambers operate in parallel with the hydraulic chamber.

A further object of the present invention is to provide a shock absorbing strut for landing gear of an aircraft which can absorb very high energy and limit the loads transmitted without catastrophic failure.

A yet still further object of the present invention is to provide a method for absorbing loads imposed by an aircraft having a high sink rate upon landing.

These and other objects of the present invention will become apparent to those skilled in the art as the description thereof proceeds.

BRIEF DESCRIPTION OF THE DRAWINGS

The present invention will be described with greater clarity and specificity with reference to the following drawings, in which.

DESCRIPTION OF THE PREFERRED EMBODIMENT

Figures 1, 2:
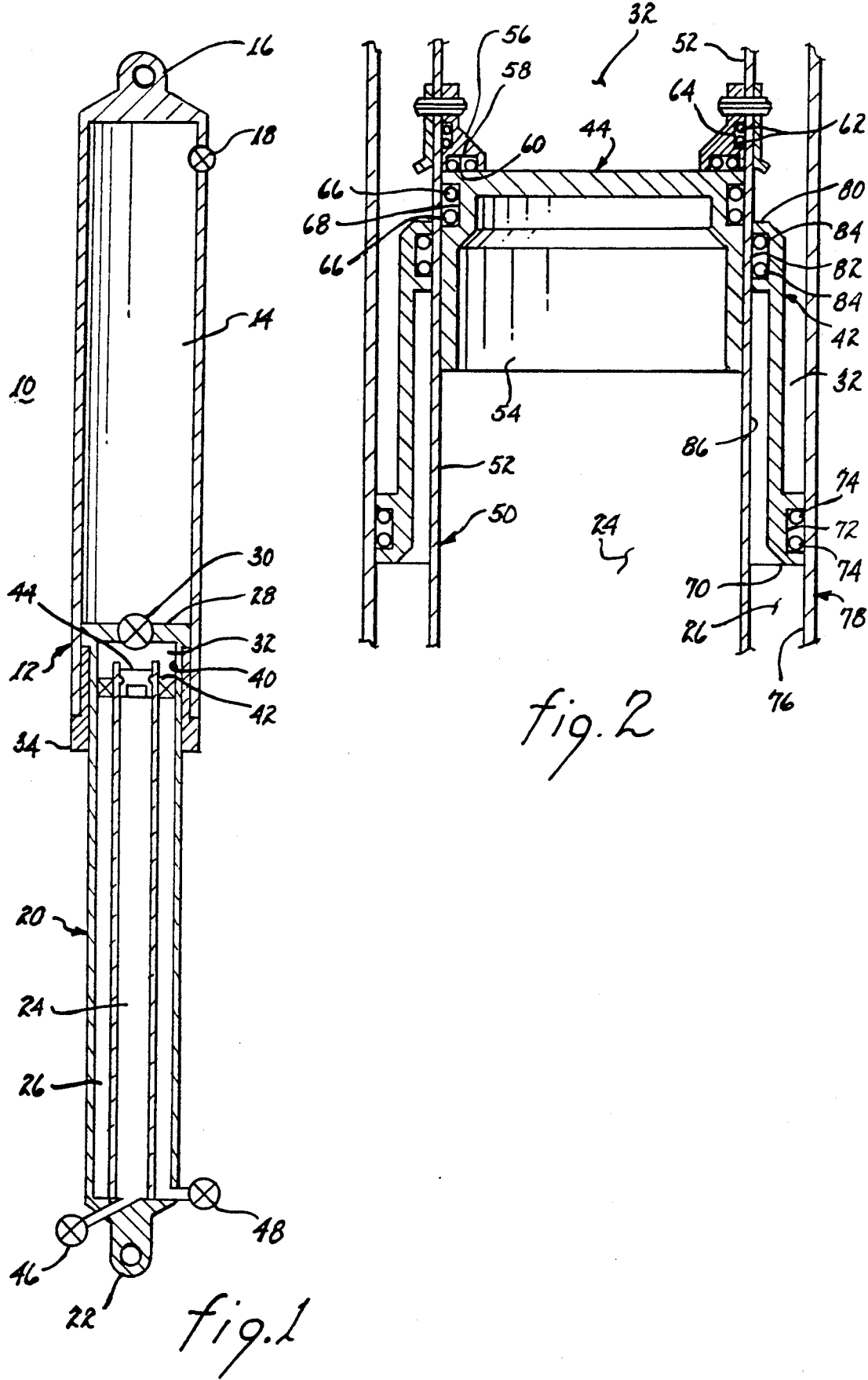
FIG. 1 is a simplified view of the major components of the present invention.
FIG. 2 is a cross sectional view illustrating the static and dynamic seals of the two pistons.

A shock strut 10 will be generally described with reference to FIG. 1, which figure illustrates a simplified form of the invention. A closed end cylinder 12 defines an oil chamber 14 filled with hydraulic fluid. A lug 16 is disposed at the end of cylinder 12 to provide a means for mounting the cylinder to the aircraft. A valve 18 serves in the manner of a port to fill the oil chamber and a pressure gauge may be attached thereto. A piston 20 is telescopingly engagable with cylinder 12 and includes a lug 22 for attachment to a wheel or wheel related fitting of an aircraft. The weight of the aircraft when at rest or while taxiing will tend to urge piston 20 into cylinder 12. During landing, the downward momentum of the aircraft fuselage will be resisted by shock strut 10 after the aircraft wheel is in contact with the ground. The energy attendant the downward momentum of the aircraft will be absorbed by the energy absorbing capability of the shock strut, as will be described in further detail below.

Piston 20 includes an inner high pressure chamber 24 and concentric lower pressure chamber 26. The high pressure chamber is filled with a gas, such as nitrogen under a typical pressure of 1,000 pounds per square inch. The gas, such as nitrogen, in low pressure chamber 26 may be at a typical pressure of 300 pounds per square inch. The upper end of piston 20 includes a plate or disc 28 serving in the manner of a piston acting against the hydraulic fluid within oil chamber 14. A valve 30 is disposed in disc 28 to permit the flow of hydraulic oil into compartment 32 disposed within piston 20 between disc 28 and chambers 24, 26. A collar or shoulder member 34, disposed within the lower end of cylinder 12, abuts the lower peripheral side of disc 28 to prevent separation of piston 20 from the cylinder.

Compartment 32 is defined by the underside of disc 28, the inner surface of wall 40 of cylinder 20, annular piston 42 disposed in chamber 26 and piston 44 disposed in chamber 24. Annular piston 42 and piston 44 preclude mixing of the hydraulic fluid emanating from oil chamber 14 with the gas disposed in chambers 24, 26.

Oil chamber 14 is preloaded to the extent that annular piston 42 is forced to translate a short distance in low pressure chamber 26. This creates a steady state pressure within both the oil chamber and compartment 32 essentially equal to the pressure in low pressure chamber 26. The result is a preload force acting outwardly between lugs 16 and 22.

Upon application of a compressive force greater than the effective preload between lugs 16 and 22 on shock strut 10, piston 20 will be urged to telescope or translate into cylinder 12. Such translation will increase the oil pressure in oil chamber 14 above that in compartment 32 and oil will flow through valve 30 to the compartment. The additional oil flow into compartment 32 will exert a force upon annular piston 42 and upon piston 44. Since the gas within low pressure chamber 26 was initially at the same pressure as that within oil compartment 14, the annular piston will be caused to translate downwardly to compress the gas within annular chamber 26. Further translation or telescoping action of cylinder 12 and piston 20 will cease when the pressure within annular chamber 26 is essentially equal to the pressure in oil chamber 14 created by the applied force. In the static case, such as just described, the pressures in oil chamber 14, compartment 32 and in low pressure chamber 26 will all remain at equilibrium and will create an outward force that also remains at equilibrium with the external force being applied to lugs 16 and 22. Piston 44 will remain in its quiescent state since the pressure in high pressure chamber 24 normally remains significantly higher than the rest of the system.

Dynamically, the system operates as described with an important distinction. Statically, the strut functions as a spring to support the aircraft, but dynamically, the device functions primarily as an energy absorber. During a high sink rate condition (relatively high closure rate of the strut), hydraulic pressure in chamber 14 will increase rapidly because the fluid will not flow through the fixed orifice quickly enough. This pressure increase will cause valve 30 to open, thus allowing greater flow and limiting the pressure increase. Continued translation of piston 20 into cylinder 12 will drive piston 42 into annular chamber 26 causing its pneumatic pressure to increase. Piston 44 will remain in its quiescent state until such time as the pressure within annular chamber 26 rises to a value equivalent to the pressure within chamber 24. Thereafter, both annular piston 42 and piston 44 will translate to compress the gas in their respective chambers until the gas in the two chambers is at a pressure equivalent with the pressure in oil chamber 14 resulting from the force imposed upon lug 16 and 22.

The actual forces applied to lugs 16 and 22 are a function of the velocity and weight of the aircraft as it collapses the strut. Total energy absorbed is the integral of the force curve over the distance that the strut is collapsed. In moderate to high sink rate cases, the hydraulic system absorbs the majority of the kinetic energy of the aircraft while the pneumatic system stores a portion in the form of higher pressure. To maintain an acceptable load limit toward the end of stroke, high pressure chamber 24 and annular low pressure chamber 26 include relief valves 46 and 48. These valves also improve system efficiency by helping to maintain a relatively constant load.

From the above summary of the invention, it will become apparent that the gas chambers initially operate serially in conjunction with the oil chamber at a predetermined pressure, the gas chambers operate in parallel with the oil chamber.

Referring to FIG. 2, the seals attendant annular piston 42 and piston 44 will be described. Chamber 24 is defined by a cylinder 50 having an inner wall 52 for supporting skirt 54 of piston 44. In the static position of piston 44 it is at its uppermost point of travel, which is defined by an annular stop 56 secured to cylinder 50. Sealing means, such as O rings 58 may be disposed within an annular groove 60 formed in stop 56. These O rings bear against the top of piston 44 and provide a seal against flow of gas from a location between skirt 54 and inner wall 52 across the top of the piston. Further sealing means, such as O rings 62 are disposed in a groove 64 formed in stop 56 adjacent inner wall 52. These O rings prevent flow of gas from within chamber 24 intermediate the stop and the inner wall of cylinder 50. A dynamic seal for piston 44 is provided by sealing means, such as O rings 66, formed within groove 68 in skirt 54 of piston 44. These O rings bear against inner wall 52 to prevent gas flow between the skirt of the piston and cylinder 50. It may be noted that the dynamic seal, O rings 66, provide a sealing function during translation of the piston.

Piston 42 includes an annularly outwardly extending ring 70 having a groove 72 for receiving sealing means, such as O rings 74. The O rings bear against inner wall 76 of cylinder 78 to form a seal against gas flow from within chamber 26 into a downward extension of compartment 32. Piston 42 includes an upper annularly inwardly extending ring 80 having a groove 82 formed therein for receiving sealing means, such as O rings 84. The O rings provide a seal between piston 42 and outer wall 86 of cylinder 50 to prevent gas flow intermediate cylinder 50 and piston 42. It may be noted that piston 42 has dynamic seals and static seals are not required since such static seals serve no purpose.

Figure 3A:
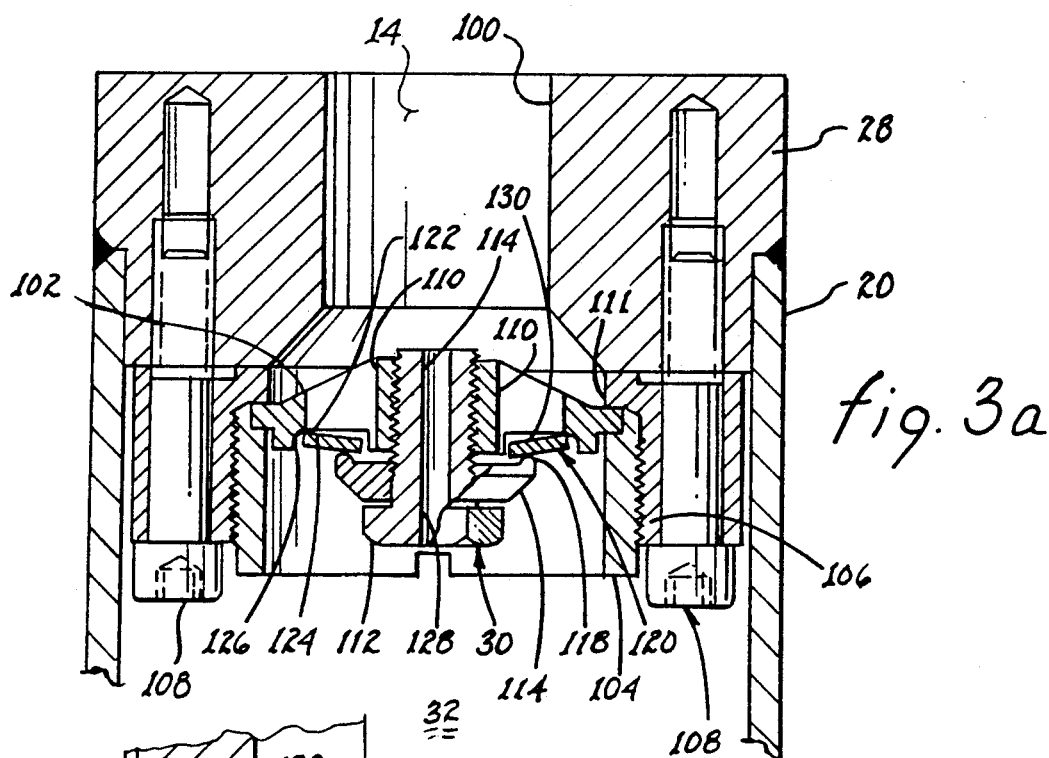
FIGS. 3a and 3b illustrate a CDS valve/orifice assembly.
Figure 3B:
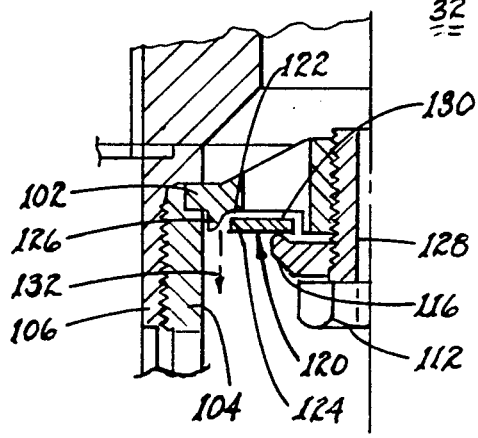

FIGS. 3a and 3b illustrate an embodiment of valve 30 in the closed and open positions, respectfully. Disc 28, secured to cylinder 20, includes an inlet 100 in fluid communication with oil chamber 14 (see FIG. 1). A plate 102 extends across inlet 111 and is secured therein by a threaded collar 104 threadedly engaging an annular flange 106 secured to disc 28 by bolts 108 extending downwardly from the plate. Plate 102 includes a plurality of conduits 110 extending therethrough and encircling the longitudinal axis of plate 102. A bolt 112 threadedly engages a threaded passageway 114 centered upon the longitudinal axis of plate 102. The bolt secures in place a fulcrum member 116 having an annular ridge 118 serving as a fulcrum. A conical disc spring (CDS) washer 120 rests upon and is supported by annular ridge 118 in downstream alignment with conduit 110. Plate 102 includes an annular shoulder 122 against which upper edge 124 of the outer perimeter of the CDS washer rests. A flow directing downwardly oriented curved annular surface 126 extends annularly outwardly from annular shoulder 122.

In the configuration illustrated in FIG. 3a, the seal provided intermediate ridge 118 and the lower surface of CDS washer 120 prevents fluid flow through conduit 110, around the inner perimeter of the CDS washer and past fulcrum member 116. The engagement of ridge 124 with annular flange 122 prevents fluid flow from conduit 110 about the outer edge of the CDS washer.

To permit return of hydraulic fluid into oil chamber 14 after compression of shock strut 10, an orifice 128 extends through bolt 112 to provide fluid communication between compartment 32 and oil chamber 14 (see FIG. 1).

Upon compression of shock strut 10, the pressure within oil chamber 14 will increase rapidly. The pressure increase will create a substantial force acting upon upper surface 130 of CDS washer 120 sufficient to cause the CDS washer to flatten from its cone shape, as shown in FIG. 3a. Such flattening will disengage ridge 124 with annular flange 122 The resulting gap will permit oil flow therebetween and downward flow of the oil, as indicated by arrow 132, will occur past curved surface 126. Simultaneously, oil flow will occur through orifice 128 in bolt 112. Upon cessation of a pressure differential between chamber 14 and compartment 32 sufficient to cause flattening of the CDS washer, the CDS washer will resume its initial shape and preclude further fluid flow through plate 102. Return of fluid to oil compartment 14 will occur through orifice 128 until the pressure in oil chamber 14 and compartment 32 has stabilized.

Figure 4:
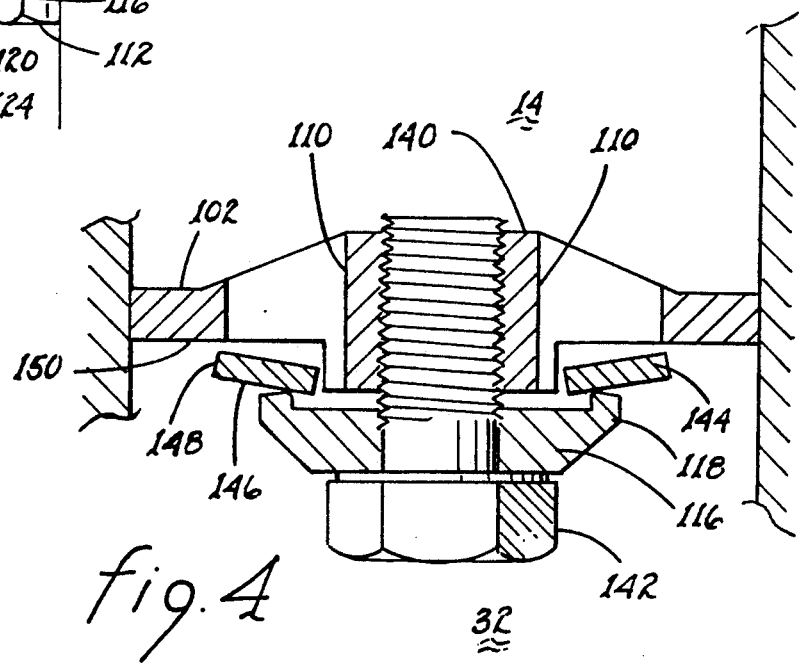
FIG. 4 illustrates a CDS valve assembly having a preset opening.

Referring to FIG. 4, there is shown an alternate setting of valve 30 from that shown in FIGS. 3a and 3b. FIG. 4 illustrates a variant valve 140 of the CDS valve shown in FIGS. 3a and 3b and which may be used as valve 30 illustrated in FIG. 1. To the extent of common components illustrated in FIG. 4 with those of FIGS. 3a and 3b, identical reference numerals will be used. Plate 102 is secured in the same manner as illustrated in FIG. 3a. A plurality of conduits 110 extend therethrough, which conduits are arranged circularly about the axis of the plate. A fulcrum member 116, including an annular ridge 118, is secured to plate 102 by a bolt 142. The fulcrum member supports a conical disc spring washer (CDS) 144. Underside 146 of the CDS washer rests upon annular ridge 118 to form a seal therebetween and prevent fluid flow between the CDS washer and the fulcrum member.

Outer peripheral edge 148 of the CDS washer is axially displaced from lower surface 150 of plate 102 extending about and radially outwardly from conduits 110. Thereby, a gap exists between peripheral edge 148 of the CDS washer and a corresponding annular section of undersurface 150. This gap permits relatively unimpeded flow of oil between oil chamber 14 above plate 102 and compartment 32 below plate 102. Upon an increase in pressure in oil chamber 14 above that present within chamber 32 and if it is of sufficient magnitude, a force will be exerted upon CDS washer 144 to cause it to slightly pivot about annular ridge 118 and flatten. Such flattening of the CDS washer will increase the gap between peripheral edge 148 and lower surface 150 to permit more rapid oil flow from oil chamber 14 into compartment 32. On cessation of a pressure differential above a predetermined magnitude, CDS washer 144 will spring back to its initial position. Thereafter, a return flow of oil from compartment 32 into oil chamber 14 past peripheral edge 148 will occur.

Figure 5A:
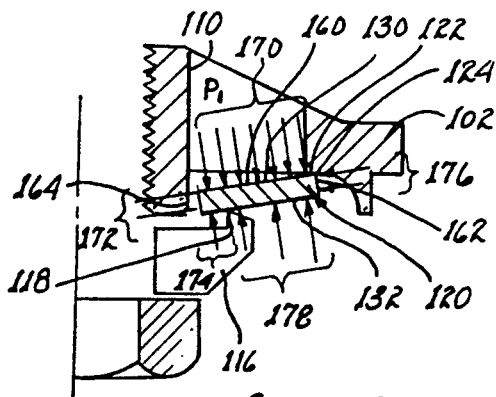
FIGS. 5a, 5b and 5c provide a functional illustration of the operation of a CDS valve.
Figure 5B:
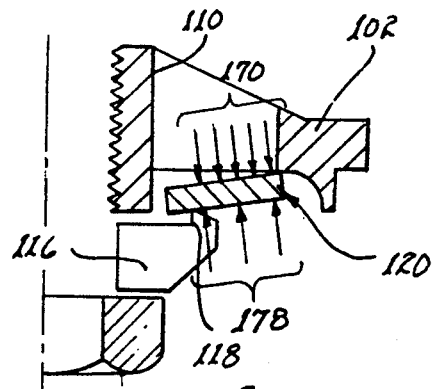
Figure 5C:
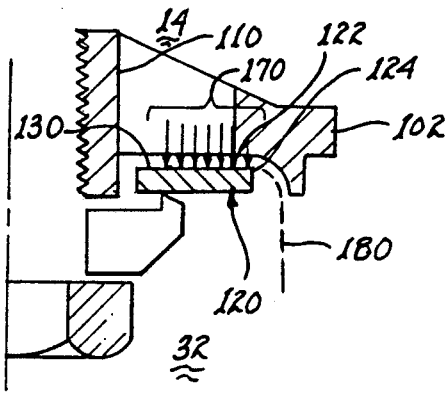

Referring jointly to FIGS. 5a, 5b and 5c, a further discussion of the operation of a conical disc spring valve will be undertaken. Conical disc 160 may be a washer like device having an outer perimeter 162 and an inner perimeter 164. The washer is dished or conical in its quiescent or free state. The cone angle defined is a function of design parameters commensurate with the flexibility and resilience of the material employed. The conical disc, or conical disc spring (CDS) washer shown in FIG. 5a is in its undeflected or free state. It is supported upon annular ridge 118 extending from fulcrum member 116; the annular ridge serves in the manner of an annular fulcrum point for the washer. Peripheral edge 124 bears against annular shoulder 122 of plate 102 in a generally sealed engagement therewith. Similarly, the contact between annular ridge 118 and lower surface 132 of CDS washer 120 is in generally sealed relationship. Accordingly, fluid from within the oil chamber will not flow past either annular ridge 118 or annular shoulder 122 when CDS washer 120 is in the configuration depicted in FIG. 5a.

As depicted in FIG. 5a, arrows 170 represent the pressure (p1) within the oil chamber acting upon upper surface 130 of conical disc 160. Similarly, arrows 172 represent the pressure in the oil chamber acting upon inner perimeter 164 of the conical disc. Arrows 174 represent the pressure within the oil chamber acting upon lower surface 132 of the conical disc radially interior of annular ridge 118. Arrows 176 represent the pressure in compartment 32 acting upon outer perimeter 162 of the conical disc. Arrows 178 represent the pressure within compartment 32 acting upon lower surface 132 of the conical disc and radially outwardly of annular ridge 118. The pressures represented by arrows 172 and 176 have no effect upon the operation of conical disc 170 since the structural rigidity of the conical disc resists these pressure differentials. Accordingly, arrows 172 and 176 have been deleted from FIG. 5b since they have no operative effect upon actuation of the conical disc. The pressure represented by arrows 174 cancel an equivalent pressure represented by an equivalent number of arrows 176. The remaining operative pressures acting upon the conical disc are represented by arrows 170 and 178, as depicted in FIG. 5b.

As shown in FIG. 5c, when the force depicted by arrows 170 exceeds the force depicted by arrows 178 to a degree sufficient to flatten (deflect) conical disc 160, upper surface 130 of the conical disc will no longer bear against annular shoulder 122. The resultant gap between conical disc 160 and annular shoulder 122 will provide a passageway from oil chamber 14 into compartment 32, as depicted by arrow 180. On cessation of the requisite pressure differential between the forces represented by arrows 170 and arrows 178, conical disc 160 will resume its previous conical configuration and prevent further fluid communication between oil chamber 14 and compartment 32.

As discussed above with respect to the configuration of valve 30 illustrated in FIGS. 3a and 3b, the bolt securing fulcrum member 116 includes an orifice extending therethrough to accommodate low flow rate equalization between oil chamber 14 and compartment 32. In the configuration of valve 30 depicted in FIG. 4, the conical disc is displaced from the annular shoulder by sufficient amount to provide a gap therebetween at all times. This gap serves the same function as the orifice extending through the bolt, as depicted in FIGS. 3a and 3b. The conical disc depicted in FIG. 4 will operate in the same manner as discussed above with respect to FIGS. 5a, 5b and 5c, to permit an increased flow rate between oil chamber 14 and compartment 32 upon the presence of a pressure differential across the disc greater than a predetermined value, which value is a function of the deflection resistance of the conical disc.

Figure 6B:
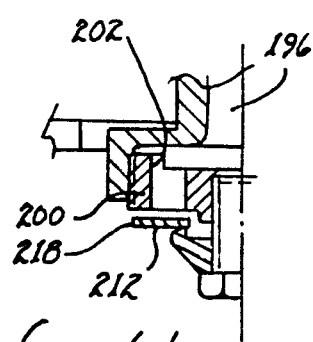
FIGS. 6a and 6b illustrate the closed and open positions of a gas relief CDS valve usable with the present invention.
Figure 6A:
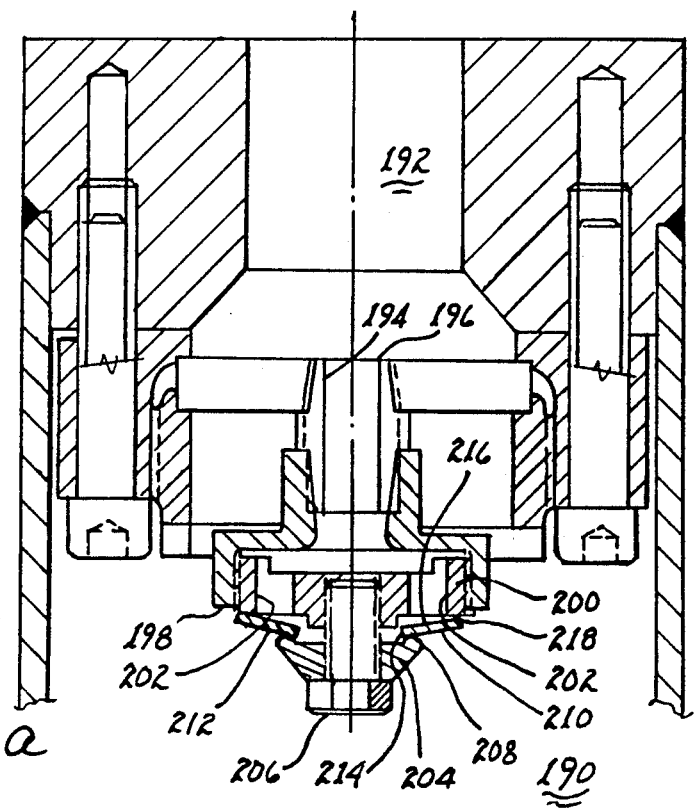

Referring to FIGS. 6a and 6b, a pressure relief valve incorporating a conical disc spring washer and suitable for use as gas pressure relief valves 46 and 48 (see FIG. 1) is depicted. Relief valve 190 is in fluid communication with a source 192 of gas under high pressure via a conduit 194 and an inlet 196 of the valve. The inlet structure includes an annular wall 198 for retainingly engaging a plate 200, which plate generally corresponds with plate 102 discussed above. A plurality of conduits 202 are disposed circularly about the longitudinal axis of plate 200 in the manner of conduits 110 described above. A fulcrum member 204 is secured to plate 200 by way of a bolt 206. The fulcrum member includes an annular ridge 208 for contactingly engaging upper surface 210 of a conical disc spring washer 212 close to inner perimeter 214. Surface 216 of the CDS washer close to outer perimeter 218 bears against an annular segment of plate 200 radially outwardly of conduits 202.

The contact between surface 210 and annular ridge 208 is a seal to preclude gas flow therebetween. Similarly, the contact between surface 216 of the CDS washer and the annular segment of plate 200 corresponding with the approximate outer perimeter of the CDS washer defines a seal to preclude gas flow therebetween.

When the gas pressure within inlet 196, transmitted from high pressure source 192, exceeds a predetermined value set by the force required to deflect CDS washer 212, the washer will deflect, as depicted in FIG. 6b. Upon deflection of CDS washer 212, a gap will develop between perimeter 218 and plate 200. This gap will permit immediate discharge of gas from source 192 via inlet 196 and conduits 202 until the force commensurate with the pressure at source 192 drops below the threshold level necessary to permit CDS washer to resume its quiescent state.

The use of a CDS washer as a valve in a relief valve environment has several advantages. The valve opens almost instantaneously upon occurrence of a predeterminable and predictable pressure level. The mass of the operative element of the valve is relatively low which reduces delays due to inertia. The size of the discharge outlet is readily calculatable as a function of the diameter of the perimeter of the CDS washer in combination with the predeterminable amount of angular deflection of the CDS washer. Thus, it suffers from none of the drawbacks of a poppet valve, which type of valve is often used as a pressure relief valve.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A telescopic shock strut for absorbing high energy levels, said shock strut comprising in combination:
   a) an oil chamber for housing a quantity of hydraulic fluid;
   b) a piston for housing a first annular gas chamber having concentric cylindrical walls and a gas disposed therein and a second cylindrical gas chamber having a gas disposed therein, said piston being disposed in telescoping relationship with said oil chamber and positionally responsive to compressive forces imposed upon said shock strut;
   c) first means responsive to the pressure within said compartment for compressing said first annular gas chamber to increase the pressure therein in response to an increase in pressure within said oil chamber and resulting from telescopic compression of said shock strut, said first compressing means comprising an annular piston including an annularly outwardly extending ring, first seal means for sealing said annularly outwardly extending ring with one of said cylindrical walls, an annularly inwardly extending ring and second seal means for sealing said annularly inwardly extending ring with the other of said cylindrical walls;
   d) second means responsive to the pressure within said compartment for compressing said second cylindrical gas chamber to increase the pressure therein in response to the pressure within said first gas chamber exceeding a predetermined level, said second compressing means comprising a further piston translatable within said second cylindrical gas chamber; and
   e) said piston including a disc for segregating said oil chamber from a compartment for receiving oil from said oil chamber, an orifice for accommodating flow of oil intermediate said oil chamber and said compartment, a disc spring valve for accommodating flow of oil from said oil chamber to said compartment under a pressure greater than a threshold pressure, said disc spring valve including an annular disc having an inner and an outer perimeter, an annular fulcrum for supporting said annular disc radially outwardly of the inner perimeter.

2. The device as set forth in claim 1 including a first pressure valve for relieving excess pressure within said first gas chamber and a second pressure relief valve for relieving excess pressure within said second gas chamber.

3. The device as set forth in claim 1 including an annular seat for engaging the outer perimeter of said annular disc to form a seal therebetween and prevent oil flow through said disc spring valve when the pressure within said oil chamber is below the threshold pressure.

4. The device as set forth in claim 1 including an annular surface adjacent to but displaced from the outer perimeter of said annular disc to provide an oil flow path between said oil chamber and said compartment irrespective of the pressure within said oil chamber.

5. A telescopic shock strut for absorbing high energy levels, said shock strut comprising in combination:
   a) an oil chamber for housing a quantity of hydraulic fluid;
   b) a piston for housing a first annular gas chamber having concentric cylindrical walls and a gas disposed therein and a second cylindrical gas chamber having a gas disposed therein, said piston being disposed in telescoping relationship with said oil chamber and positionally responsive to compressive forces imposed upon said shock strut;
   c) first means responsive to the pressure within said compartment for compressing said first annular gas chamber to increase the pressure therein in response to an increase in pressure within said oil chamber and resulting from telescopic compression of said shock strut, said first compressing means comprising an annular piston including an annularly outwardly extending ring with one of said cylindrical walls, an annularly inwardly extending ring and first seal means for sealing said annularly outwardly extending ring and second seal means for sealing said annularly inwardly extending ring with the other of said cylindrical walls; and
   d) second means responsive to the pressure within said compartment for compressing said second cylindrical gas chamber to increase the pressure therein in response to the pressure within said first gas chamber exceeding a predetermined level, said second compressing means comprising a further piston translatable within said second cylindrical gas chamber.

6. The device as set forth in claim 3 including annular means disposed within said second cylindrical gas chamber for limiting in one direction the movement of said further piston.

7. The device as set forth in claim 6 including seal means disposed intermediate said annular limiting means and said further piston.

* * * * *